United States Patent
Schneider et al.

(10) Patent No.: US 11,959,436 B2
(45) Date of Patent: Apr. 16, 2024

(54) PISTON INCLUDING SPIRAL FEATURES TO INCREASE IN-CYLINDER SWIRL

(71) Applicant: Tenneco Inc., Lake Forest, IL (US)

(72) Inventors: Norbert Schneider, Ann Arbor, MI (US); Michael Weinenger, Southfield, MI (US); Thomas Harris, Dexter, MI (US)

(73) Assignee: Tenneco Inc., Lake Forest, IL (US)

( * ) Notice: Subject to any disclaimer, the term of this patent is extended or adjusted under 35 U.S.C. 154(b) by 0 days.

(21) Appl. No.: 17/948,462

(22) Filed: Sep. 20, 2022

(65) Prior Publication Data

US 2024/0093658 A1    Mar. 21, 2024

(51) Int. Cl.
    *F02F 3/14*    (2006.01)
(52) U.S. Cl.
    CPC ..................................... *F02F 3/14* (2013.01)
(58) Field of Classification Search
    CPC .......................................................... F02F 3/14
    See application file for complete search history.

(56) References Cited

U.S. PATENT DOCUMENTS

| | | | | |
|---|---|---|---|---|
| 5,103,784 | A * | 4/1992 | Evans | F02B 23/08 123/263 |
| 6,729,290 | B1 | 5/2004 | Rorke | |
| 8,555,854 | B2 | 10/2013 | Rothbauer et al. | |
| 9,476,381 | B2 | 10/2016 | Böwing et al. | |
| 9,915,222 | B2 | 3/2018 | Mackey et al. | |
| 10,393,063 | B2 * | 8/2019 | Singh | F02F 3/24 |
| 10,415,456 | B2 | 9/2019 | Brandt | |
| 11,098,676 | B1 | 8/2021 | Vassallo et al. | |
| 2003/0172896 | A1 * | 9/2003 | Sczepanski | F02F 3/26 123/193.6 |
| 2017/0067391 | A1 * | 3/2017 | Brandt | F02B 23/0624 |
| 2019/0003372 | A1 * | 1/2019 | Eismark | F02B 23/0678 |
| 2019/0093598 | A1 * | 3/2019 | Singh | F02B 23/06 |
| 2019/0186341 | A1 * | 6/2019 | Ness | F02B 23/0621 |
| 2019/0376466 | A1 * | 12/2019 | Svensson | F02B 23/0687 |
| 2020/0095920 | A1 * | 3/2020 | Svensson | F02B 23/0624 |
| 2020/0141305 | A1 * | 5/2020 | Dembinski | F02B 23/0678 |
| 2020/0182190 | A1 | 6/2020 | Ra et al. | |
| 2022/0034279 | A1 * | 2/2022 | Joshi | F02B 23/0624 |

FOREIGN PATENT DOCUMENTS

| | | |
|---|---|---|
| EP | 2204559 B1 | 4/2017 |
| JP | 2007278095 A | 10/2007 |

* cited by examiner

*Primary Examiner* — Long T Tran
(74) *Attorney, Agent, or Firm* — Robert L. Stearns; Dickinson Wright PLLC

(57) ABSTRACT

A piston for an internal combustion engine which includes a crown having spiral features designed to increase swirl of combustion gases in a cylinder of the engine is provided. The spiral features can be located in a combustion surface or in a combustion bowl of the crown. The increased swirl of the combustion gases is expected to improve mixing of the air and fuel injected into the cylinder, and thus cause the fuel to burn more completely, achieve better efficiency out of the injected fuel, and reduce unburned hydrocarbons in the exhaust gas.

15 Claims, 3 Drawing Sheets

PISTON INCLUDING SPIRAL FEATURES TO INCREASE IN-CYLINDER SWIRL

BACKGROUND OF THE INVENTION

1. Technical Field

This invention relates generally to pistons for internal combustion engines, and methods of manufacturing the pistons.

2. Related Art

A piston is designed to reciprocate up and down in a cylinder of an internal combustion engine of a vehicle. During operation of the engine, a mixture of combustion gases (fuel and air) is injected into the cylinder, and the piston moves upward to compress the mixture of fuel and air. The mixture of fuel and air is ignited, for example by a spark plug, and the ignition forces the piston downward in the cylinder, which provides energy to run the vehicle. A good mixture of the fuel and air in the cylinder is desired in order to efficiently burn the fuel.

SUMMARY

One aspect of the invention provides a piston which includes a crown with spiral features designed to increase swirl of combustion gases in a cylinder of the engine. The increased swirl of the combustion gases is expected to improve mixing of air and fuel injected into the cylinder, and thus cause the fuel to burn more completely, achieve better efficiency out of the injected fuel, and reduce unburned hydrocarbons in exhaust gas.

According to one embodiment, the piston includes a crown extending longitudinally along a center axis and an outer rim extending circumferentially around the center axis. The crown includes a combustion surface extending from the outer rim toward the center axis and a combustion bowl extending from the combustion surface toward the center axis. The combustion surface includes the spiral features disposed around the center axis. Each spiral feature has a first wall extending at an angle of 10 to 45° relative to the outer rim, and a second wall extending from the first wall to a first wall of an adjacent spiral feature. The second wall extends at an angle of 15 to 60° relative to the outer rim. The first wall and the second wall present an apex therebetween. Each spiral feature has an outer wall extending from the bowl rim toward the center axis and the apex, and each spiral feature has an inner wall extending from the combustion bowl away from the center axis and toward the apex.

According to another embodiment, the piston includes a crown with a combustion surface extending circumferentially around a center axis, the crown includes a combustion bowl extending from the combustion surface toward the center axis, and the combustion bowl includes the spiral features disposed around the center axis.

BRIEF DESCRIPTION OF THE DRAWINGS

These and other aspects, features and advantages of the invention will become more readily appreciated when considered in connection with the following detailed description, appended claims and accompanying drawings, in which:

DETAILED DESCRIPTION OF EXEMPLARY EMBODIMENTS

Figure 1:
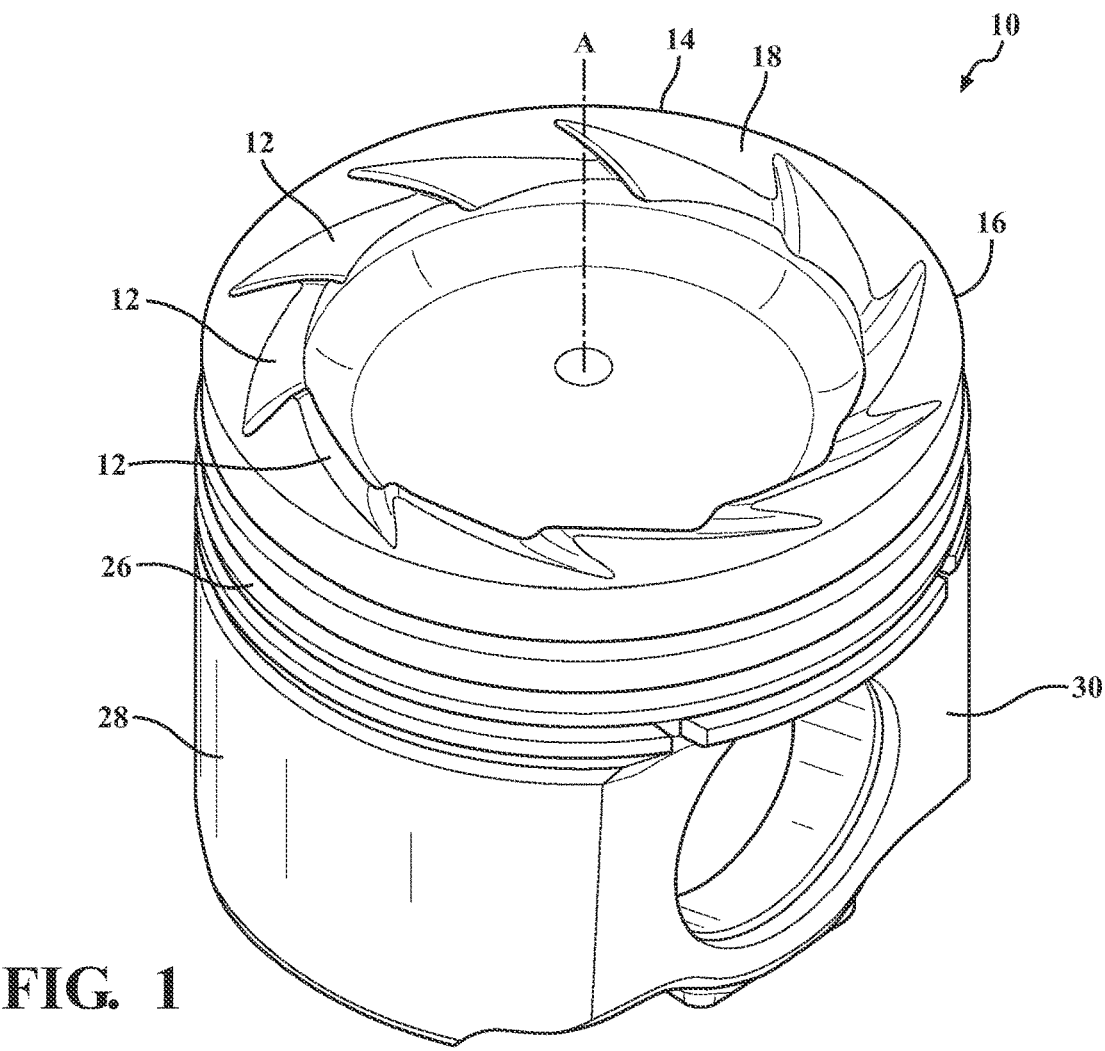
FIG. 1 is a perspective view of a piston including a combustion surface with spiral features according a first example embodiment.
Figure 2:
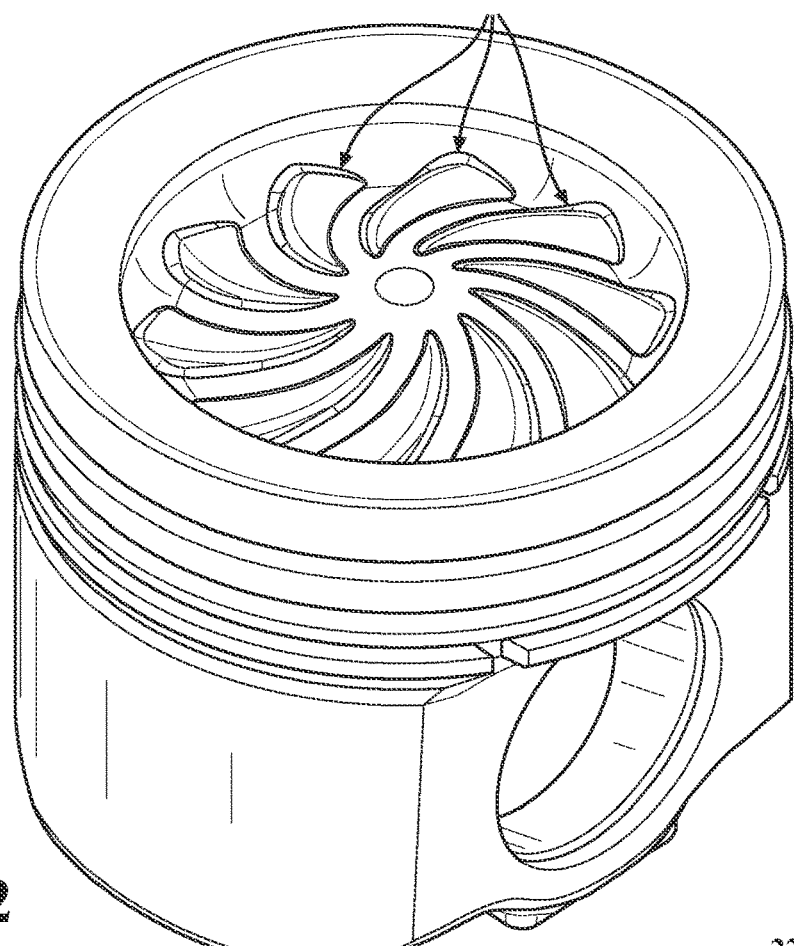
FIG. 2 is a perspective view of a piston including a combustion bowl with spiral features according a second example embodiment.
Figure 3:
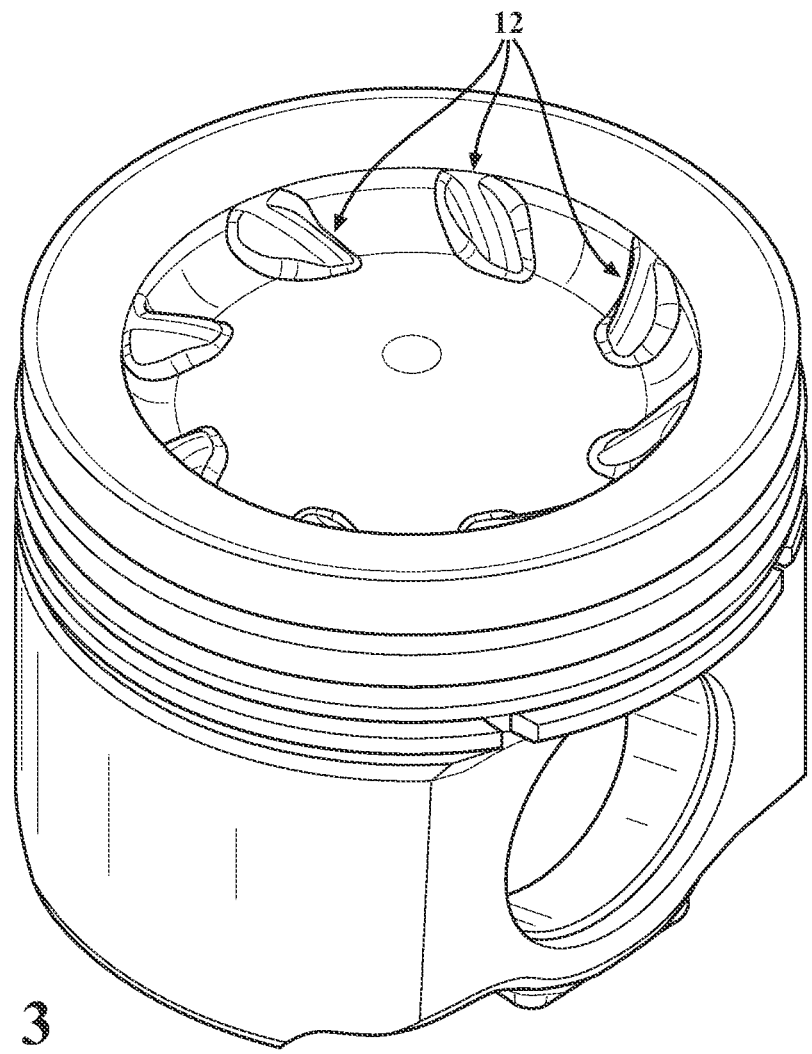
FIG. 3 is a perspective view of a piston including a combustion bowl with spiral features according a third example embodiment.

One aspect of the invention provides a piston 10 for an internal combustion engine which includes spiral features 12 designed to increase swirl of combustion gases in a cylinder of the engine. The increased swirl of the combustion gases is expected to improve mixing of air and fuel injected into the cylinder, and thus cause the fuel to burn more completely, achieve better efficiency out of the injected fuel, and reduce unburned hydrocarbons in the exhaust gas. Examples of the piston 10 including the spiral features 12 are shown in FIGS. 1-3. The piston 10 is typically formed of steel, or another iron-based material, but can be formed of an aluminum-based material or another metal material.

According to the example embodiments, the piston 10 includes a crown 14 extending longitudinally along a center axis A and an outer rim 16 extending circumferentially around the center axis A. The crown 14 includes a combustion surface 18 extending from the outer rim 16 toward the center axis A, and a combustion bowl 20 extending from the combustion surface 18 toward the center axis A. In the embodiments of FIGS. 1-3, the combustion bowl 20 includes a concave surface 22 extending from the spiral 12 features toward the center axis A and an inclined surface 24 extending from the concave surface 22 toward the center axis A. The piston 10 also typically includes a ring belt 26 extending downward from the outer rim 16, a pair of skirt sections 28 extending downward from the ring belt 26, and a pair of pin bosses 30 disposed between the skirt sections 28. The piston 10 may include a cooling gallery (not shown) for containing a cooling fluid, or the piston 10 could be galleryless.

Figure 1A:
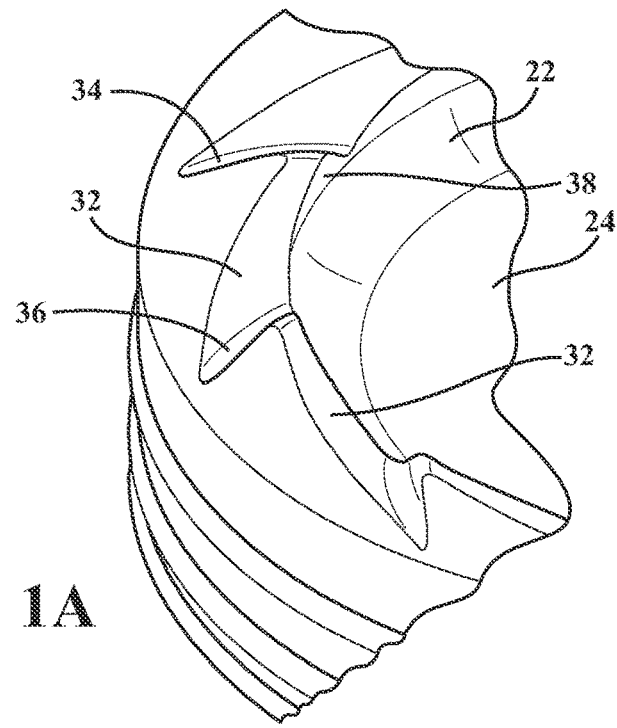
FIG. 1A is an enlarged view of a portion of the piston of FIG. 1.

In the embodiment shown in FIGS. 1 and 1A, the spiral features 12 are formed in the combustion surface 18 and are spaced from one another about the center axis A. The concave surface 22 extends away from the spiral features 12 toward the center axis A, and the inclined surface 24 extends from the concave surface 22 toward the center axis A. Each spiral feature 12 has a first wall 32 and a second wall 34 extending from the first wall 32 to a first wall 32 of an adjacent spiral feature 12. The first wall 32 extends at an angle of 10 to 45° relative to the outer rim 16, and the second wall 34 extends at an angle of 15 to 60° relative to the outer rim 16. Each first wall 32 extends in a spiral shape. The first wall 32 and the second wall 34 present an apex therebetween. Each spiral feature 12 has an outer wall 36 extending from the outer rim 16 toward the center axis A and the apex, and each spiral feature 12 has an inner wall 38 extending away from the center axis A and toward the apex. According to the embodiment of FIG. 1, ten (10) of the spiral features 12 are present in the combustion surface 18, and the spiral features 12 form 5% to 20% of a total surface area of the combustion surface 18 and combustion bowl 20 combined.

Figure 2A:
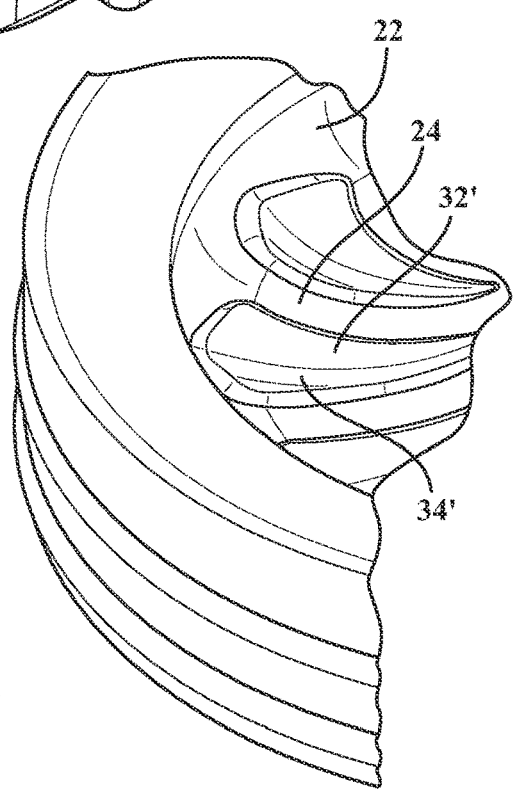
FIG. 2A is an enlarged view of a portion of the piston of FIG. 2.

According to the embodiments of FIGS. 2 and 3, the spiral features 12 are formed in the combustion bowl 20 instead of in the combustion surface 18. In the embodiment of FIG. 2, the spiral features 12 extend from the concave surface 22 to the inclined surface 24, and the spiral features 12 are spaced from one another by a portion of the inclined surface 24. According to this embodiment, each spiral feature 12 includes a first wall 32' extending upward in a spiral shape away from the center axis A. Each spiral feature 12 also includes a second wall 34' extending upward in a spiral shape away from the center axis A and to the first wall 32'. As shown in FIG. 2A, the first wall 32' and the second wall 34' present an apex therebetween. The first wall 32' is concave, and the second wall 34' is convex. According to the embodiment of FIG. 2, ten (10) of the spiral features 12 are present in the combustion bowl 20, and the spiral features 12 form 5% to 35% of a total surface area of the combustion surface 18 and combustion bowl 20 combined.

Figure 3A:
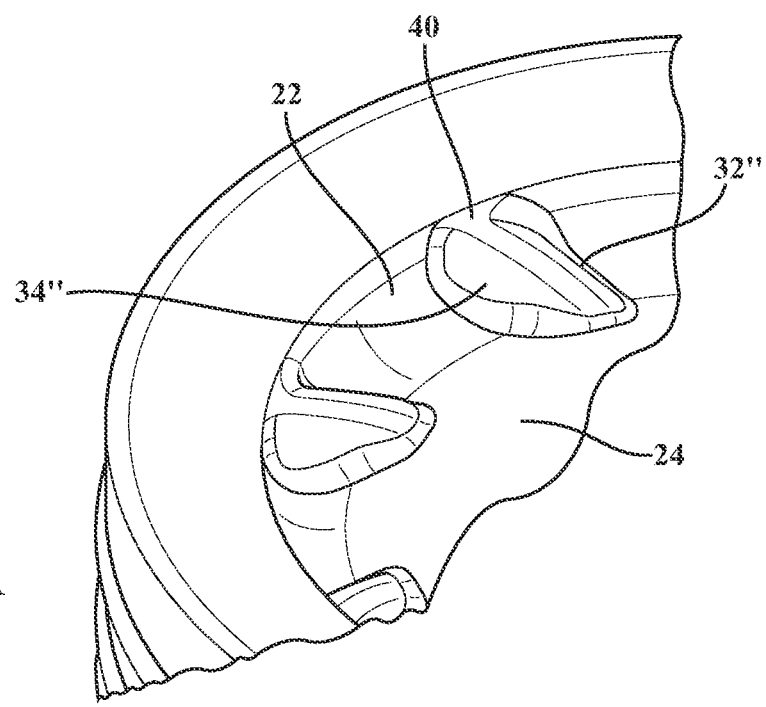
FIG. 3A is an enlarged view of a portion of the piston of FIG. 3.

According to the embodiment of FIG. 3, each spiral feature 12 includes a first wall 32" extending upward from the combustion bowl 20 and in a spiral shape away from the center axis A, and each spiral feature 12 includes a second wall 34" extending upward from the combustion bowl 20 in a spiral shape away from the center axis A. As shown in FIG. 3A, each spiral feature 12 also includes a third wall 40 extending from the first wall 32" to the second wall 34". The first wall 32" and the second wall 34" have a convex shape, and the third wall 40 is planar. According to the embodiment of FIG. 3, eight (8) of the spiral features 12 are present in the combustion bowl 20, and the spiral features 12 form 8% to 36% of a total surface area of the combustion surface 18 and combustion bowl 20 combined.

As mentioned above, the spiral features 12 are designed to increase swirl of the combustion gases (air and fuel) which are injected into the cylinder, in which the piston 10 reciprocates, during operation of the engine. The increasing swirl, or rotation, of the air and fuel is expected to cause the fuel to burn more completely, which achieves better efficiency out of the injected fuel and reduce the amount of unburned hydrocarbons in exhaust gas discharged from the cylinder.

The spiral features 12 in the combustion surface, as shown in FIG. 1, create swirl in the combustion gases as the piston 10 moves to a top dead center position during a compression stroke. As the piston 10 nears the top of the cylinder, gases are pressed inward from the combustion surface at the top of the piston 10 and toward the combustion bowl 20. The gases pass over the spiral features 12 on the combustion surface 18 and are deflected into a swirling motion.

The spiral features 12 formed in the combustion bowl 20 of the second and third embodiments deflect air located in the combustion bowl 20 into a swirling motion as the piston 10 rises toward the top dead center position. The additional benefit of the spiral features 12 on the included surface 24, as shown in FIG. 2, is that they could also deflect injected fuel spray into a similar swirling motion. The additional benefit of the spiral features 12 on the concave surface 22, as shown in FIG. 3, is that they could prevent interaction between fuel plumes, resulting in a more complete and efficient combustion.

Obviously, many modifications and variations of the present invention are possible in light of the above teachings. It is, therefore, to be understood that within the scope of the appended claims, the invention may be practiced otherwise than as specifically described.

What is claimed is:

1. A piston, comprising:
   a crown extending longitudinally along a center axis and an outer rim extending circumferentially around the center axis,
   the crown including a combustion surface extending radially from the outer rim toward the center axis,
   the crown including a combustion bowl extending radially from the combustion surface toward the center axis,
   the combustion surface including spiral features disposed around the center axis,
   each spiral feature having a first wall extending at an angle of 10 to 45° relative to the outer rim,
   each spiral feature having a second wall extending from the first wall to a first wall of an adjacent spiral feature,
   the second wall extending at an angle of 15 to 60° relative to the outer rim,
   first wall and the second wall presenting an apex therebetween,
   each spiral feature having an outer wall extending from the bowl rim toward the center axis and the apex,
   each spiral feature having an inner wall extending from the combustion bowl away from the center axis and toward the apex,
   the combustion bowl including a concave surface disposed radially inward of the spiral features between the spiral features and the center axis, and
   wherein the concave surface is not radially aligned with the spiral features or radially outward of the spiral features.

2. The piston according to claim 1, wherein each first wall extends in a spiral shape.

3. The piston of claim 1, wherein the combustion bowl includes an inclined surface extending from the concave surface toward the center axis.

4. The piston according to claim 1 including a ring belt extending downward from the outer rim, a pair of skirt sections extending downward from the ring belt, and a pair of pin bosses disposed between the skirt sections.

5. The piston according to claim 1 including ten (10) of the spiral features.

6. The piston according to claim 1, wherein the piston is formed of an iron-based or aluminum-based material.

7. The piston according to claim 6, wherein spiral features form 5% to 35% of a total surface area of the combustion surface and combustion bowl combined.

8. The piston according to claim 6, wherein spiral features form 8% to 36% of a total surface area of the combustion surface and combustion bowl combined.

9. The piston according to claim 1, wherein spiral features form 5% to 20% of a total surface area of the combustion surface and combustion bowl combined.

10. The piston according to claim 1, wherein each spiral feature includes a first wall extending upward from the combustion bowl and in a spiral shape away from the center axis, and
    each spiral feature includes a second wall extending upward from the combustion bowl in a spiral shape away from the center axis and to the first wall, the first wall and the second wall presenting an apex therebetween.

11. The piston according to claim 10, wherein the first wall is concave and the second wall is convex.

12. The piston according to claim 1, wherein each spiral feature includes a first wall extending upward from the combustion bowl and in a spiral shape away from the center axis, each spiral feature includes a second wall extending upward from the combustion bowl in a spiral shape away from the center axis, each spiral feature includes a third wall extending from the first wall to the second wall, and the first wall and the second wall have a convex shape.

13. The piston according to claim 12, wherein the third wall is planar.

14. The piston according to claim 12 including eight of the spiral features circumferentially spaced from one another about the center axis.

15. The piston according to claim 1, wherein the piston is formed of steel.

\* \* \* \* \*